United States Patent [19]

Kadota et al.

[11] Patent Number: 5,489,770
[45] Date of Patent: Feb. 6, 1996

[54] HAND-HELD SCANNER HAVING A FOLDED OPTICAL PATH PROVIDING A COMPACT DESIGN

[76] Inventors: Toshiyuki Kadota, 532 Meiwa dorm, 6 chome 30 banchi, Tennou-cho, Kariya-shi, Aichi-pref. 448; Yasushi Iwade, 1, Nishiyamanota, Sato machi, Anjou-shi, Aichi-pref. 446; Tadao Oshima, 4 chome 1829 banchi, Houjin, Minato-ku, Nagoya-shi, Aichi-pref. 455, all of Japan

[21] Appl. No.: 207,150

[22] Filed: Mar. 8, 1994

[30] Foreign Application Priority Data

Mar. 8, 1993 [JP] Japan ..................................... 5-046775
Feb. 7, 1994 [JP] Japan ..................................... 6-013601

[51] Int. Cl.[6] ..................................................... G06K 7/10
[52] U.S. Cl. ............................................. 235/472; 235/462
[58] Field of Search ..................................... 235/462, 472

[56] References Cited

U.S. PATENT DOCUMENTS 4,560,862  12/1985  Eastman et al. ......................... 235/462
4,682,041   7/1987  Egami et al. ........................... 250/571
4,816,659   3/1989  Bianco et al. .......................... 235/462
4,900,907   2/1990  Matusima et al. ....................... 235/472
5,081,343   1/1992  Chadima et al. ........................ 235/462
5,189,533   2/1993  Taguchi et al. ......................... 359/18

FOREIGN PATENT DOCUMENTS 488202  6/1992  European Pat. Off. .

Primary Examiner—Donald T. Hajec
Assistant Examiner—Mark S. Tremblay

[57] ABSTRACT

In an optical information reading apparatus in which the degree of freedom with which the apparatus is shaped is improved, a mirror for bending a reflected light which has passed through an image forming lens is disposed between the image forming lens and an image sensor, whereby the provision of the image sensor at a position which is not on a line extending between the image forming lens and the mirror is enabled. That is, a space located beyond the line extending between the image forming lens and the mirror can be freely altered, thus increasing the degree of freedom with which a casing is shaped.

17 Claims, 5 Drawing Sheets

FIG. IA
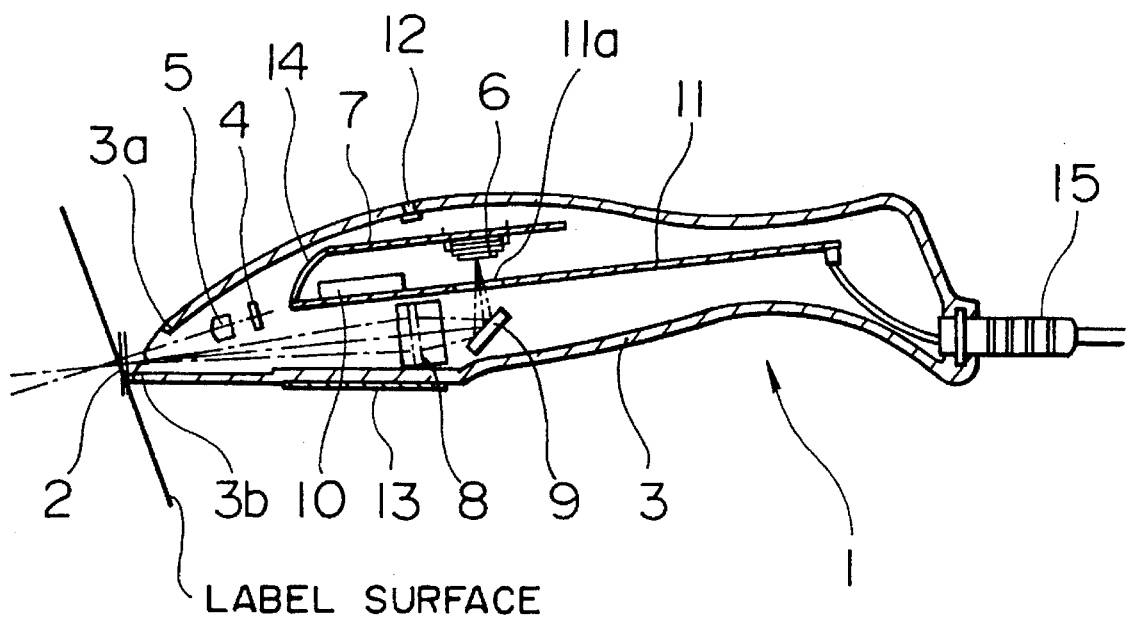
LABEL SURFACE
FIG. IB
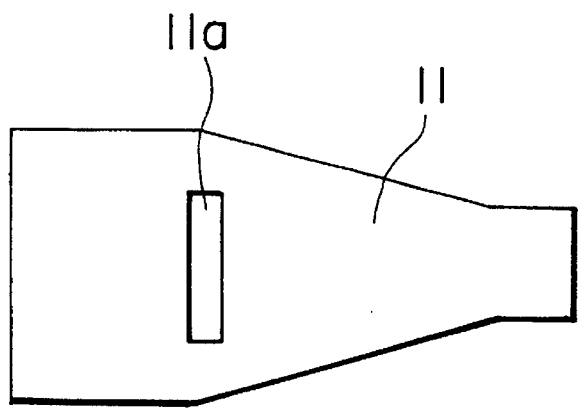

LABEL SURFACE

HAND-HELD SCANNER HAVING A FOLDED OPTICAL PATH PROVIDING A COMPACT DESIGN

BACKGROUND OF THE INVENTION

1. Field of the Invention

The present invention relates to an optical information reading apparatus for reading optical information carried on, for example, a bar code label.

2. Description of Related Art

An example of a conventional optical information reading apparatus of the above-described type is a bar code reader 20 shown in FIG. 7. The bar code reader 20 is designed to illuminate light from an LED module 21 toward a bar code label 23 through an illumination lens 22. The light reflected by the bar code label 23 is taken into the apparatus from a reading port. In the apparatus, after the reflected light is bent by a mirror 24, it enters an image sensor 26 through an image forming lens 25, forming the image of a bar code thereon, whereby the optical information is read on the basis of the reflected light.

However, in the above-described type of ordinary bar code reader 20, since an optical path through which the reflected light from the bar code label 23 is condensed on the image sensor 26 through the image forming lens 25 must observe known optical constraints, a space corresponding to the length of the optical path must be provided in the apparatus. Further, the image sensor 26 on which the reflected light is condensed has a predetermined width, and a space (in the direction perpendicular to the surface of the paper shown in FIG. 7) corresponding to that width must be provided, thus restricting the shape of the portion of the bar code reader 20 near the image sensor 26.

In other words, the shape of the ordinary bar code reader 20 is affected and limited by both the length of the optical path and the shape of the components which constitute the apparatus. Particularly, there are many restrictions regarding the shape of the region near of the image sensor 26, which is the handle portion of the apparatus.

SUMMARY OF THE INVENTION

In view of the above-described problems of the prior art, an object of the present invention is to provide an optical information reading apparatus which enables structural restrictions of the shape thereof to be eliminated and thus enables the degree of freedom with which the apparatus is shaped to be improved.

In the optical information reading apparatus according to the present invention, the reflected light generated from illumination light of an illumination means and having optical information impressed thereon is condensed to a predetermined reading position by an image forming means. An imaging means for converting light into an electrical signal is disposed at a predetermined reading position to produce an electrical signal representing the reflected light. An optical path changing means for bending the reflected light from the image forming means is disposed between the image forming means and the imaging means, by virtue of which the reading position can be changed to a position which is not on a line extending between the image forming means to the optical path changing means. That is, the imaging means is not disposed in the space located on the rear side of the line extending between the image forming means and the optical path changing means, and the space located on the rear side of the optical path changing means can thus be freely shaped.

The optical path changing means may bend the direction of propagation of the reflected light so that an angle between the direction of propagation of the reflected light which is not yet bent and the direction of propagation of the reflected light which has been bent is between 45° and 135°.

A portion of an internal space of a casing which accommodates therein the respective means, which is located on a side of either the imaging means or the optical path changing means where the illumination means and the image forming means are not disposed, is reduced. Consequently, the portion of the casing corresponding to the reduced internal space can be freely shaped. Since the operator handles that freely shaped portion of the apparatus to operate the apparatus, the operability of the apparatus can be improved.

A reading means setting substrate on which a reading means is provided is provided in a space between the optical path changing means and the imaging means. Normally, no means can be disposed in the space between the optical path changing means and the imaging means, because the reflected light passes through that space when it reaches the imaging means. However, in the above case, since the reading means setting substrate has an opening through which the reflected light passes, the reading means setting substrate can be disposed in the space between the optical path changing means and the imaging means, and the internal space can thus be effectively utilized. Further, the degree of freedom with which the casing is shaped can be improved.

A coupling member is disposed between an imaging means setting substrate on which at least the imaging means is provided and the reading means setting substrate for coupling the imaging means setting substrate and the reading means setting substrate to each other. The coupling member is fixed to the casing. That is, since the imaging means setting substrate and the reading means setting substrate are formed as one unit by the coupling member and since the coupling member alone is fixed to the casing, it is not necessary for the imaging means setting substrate and the reading means setting substrate to be fixed to the casing, thus facilitating the provision of these means.

The image forming means and the optical path changing means are fixed in the casing at a predetermined position by the same fixing member. The positional relationship between the image forming means and the optical path changing means, which is affected by the fixing member, has substantially no error, because the image forming means and the optical path changing means are fixed by the same fixing member. That is, there is no error in the optical path along which the reflected light propagates from the image forming means to the optical path changing means.

Reading ports for taking in the reflected light from the objective for reading on which the optical information is written comprise end portions located at different distances from the objective for reading. The end portion located on a side where an operator visually recognizes the objective for reading during reading is at a distance farther from the objective for reading than the other end portion. That is, when the reading ports are brought into contact with the objective for reading, a gap is generated, and this enables the operator to check whether the objective for reading is reliably illuminated.

The optical path changing means bends the direction of propagation of the reflected light which is not yet condensed on the predetermined reading position in a direction substantially perpendicular to said direction of propagation. Consequently, when the light-receiving surface of the imaging means is to be set in the casing, it can be set by adjusting the position only in one direction.

BRIEF DESCRIPTION OF THE DRAWINGS

FIGS. 1A and 1B are respectively cross-sectional and plan views of an embodiment of the present invention;

DETAILED DESCRIPTION OF THE PREFERRED EMBODIMENTS

Figure 2A:
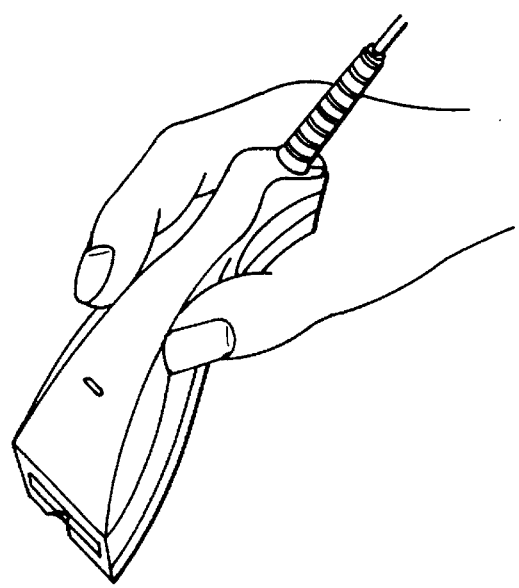
FIGS. 2A and 2B are perspective views showing how a bar code reader according to the present invention is used.

An embodiment of the present invention applied to a bar code reader 1 for reading a bar code label 2 will be described below.

In FIG. 1A, the bar code reader 1 includes a casing 3, an LED module 4 in which a plurality of LEDs for illuminating the bar code label 2 are aligned, an illumination lens 5 provided in front of the LED module 4 to concentrate the light from the LED module 4 onto the bar code label 2, a one-dimensional photoelectric converting device (hereinafter referred to as an image sensor 6) made up of a large number of light-receiving elements which are aligned in one row, a fixing plate 7 for fixing the image sensor 6 to which the image sensor 6 is electrically connected, an image forming lens 8 for condensing the reflected light from the bar code label 2 on the image sensor 6, a mirror 9 provided between the image forming lens 8 and the image sensor 6 to change the direction of the reflected light from the bar code label 2 so that it can reach the light receiving surface of the image sensor 6, an electronic control unit (hereinafter referred to as an ECU 10) for reading the information carried on the bar code label 2 on the basis of the electrical signal from the image sensor 6, and a substrate 11 on which the ECU 10 is provided.

On the upper surface of the casing 3 is provided a lamp 12 for displaying completion of reading of the bar code label 2. A stabilizing plate 13 used to place the bar code reader 1 in a stable condition is provided on the lower surface of the casing 3. Further, the fixing plate 7 on which the image sensor 6 is provided is electrically connected to the substrate 11 on which the ECU 10 is provided via a flat wire 14 in order to achieve transmission of the electrical signal of, for example, the image sensor 6 to the ECU 20. Also, the fixing plate 7 and the substrate 11 are structurally coupled to each other via a fixing member which is not shown. A cable cord 15 is connected to the bar code reader 1 in order to transmit the information carried on the bar code label 2 to an external apparatus which is not shown. The direction in which the light-receiving elements of the image sensor 6 are aligned coincides with the central axis of the image forming lens 8 through the mirror 9. The image forming lens 8 and the mirror 9 are fixed to the casing 3 by means of the same component member which is not shown. In order to allow the reflected light from the mirror 9 to reach the light-receiving surface of the image sensor 6, an opening 11a through which the reflected light can pass is provided in the substrate 11, as shown in FIG. 1B.

The operation of the bar code reader 1 will be described below.

In FIG. 1A, the LED module 4 illuminates the bar code label 2 with light through the illumination lens 5. Reflected light representing the optical information carried on the bar code label 2 is generated from the illumination light. The reflected light from the bar code label 2, which is taken into the reader 1 from reading ports 3a and 3b, is condensed by the image forming lens 8. The condensed reflected light reaches the mirror 9. The mirror 9 bends the optical path of the reflected light in a direction perpendicular to the direction of incidence so that the reflected light can reach the light-receiving surface of the image sensor 6. Since bars and spaces of the bar code label 2 have different reflectivities, the portion of the reflected light incident on the image sensor 6 representing the bar produces a low level signal while the portion of the reflected light representing the space produces a high level signal. As a result, a signal train, which is the representation of the configuration of a bar code, made up of bars and spaces having different widths, is output from the image sensor 6 to the ECU 10 provided on the substrate 11. The ECU 10 takes in the information carried on the bar code label 2 on the basis of the signal train, and transmits the information to the external apparatus which is not shown.

The present invention has the following feature.

The optical path through which the reflected light from the bar code label 2 is condensed on the image sensor 6 by the image forming lens 8 is determined on the basis of the various optical constraints, and hence the space corresponding to the length of the optical path must be provided in the apparatus. Further, since the image sensor 6 has a predetermined width (in the direction perpendicular to the surface of the paper in FIG. 1A), the space corresponding to the width of the image sensor 6 must be provided in the reader.

Hence, in the present invention, the mirror 9 for bending the direction of propagation of the reflected light to a direction perpendicular to the direction of incidence is provided on the optical path along which the reflected light propagates between the image forming lens 8 and the image sensor 6. Consequently, the optical distance in the rightward and leftward directions as viewed in FIG. 1A is reduced as compared with a conventional bar code reader. Further, the image sensor 6 is located closer to the reading ports from which the reflected light is taken in, and the length of the portion of the reader corresponding to the rear side of the image sensor 6 (substantially the right side of the center in FIG. 1A) can thus be reduced. As is clear from above, since the mirror 9 is provided between the image forming lens 8 and the image sensor 6 in the present invention, the optical space required for reading can be reduced as compared with the conventional bar code reader, and restrictions placed on the shape of the reader can thus be eliminated, i.e., the shape of the handle portion can be freely determined.

In this embodiment, the mirror 9, which changes the direction of propagation of the reflected light to the direction perpendicular to the direction of incidence, is provided between the image forming lens 8 and the image sensor 6. The mirror 9 may also be provided between the bar code label 2 and the image forming lens 8.

Figure 2B:
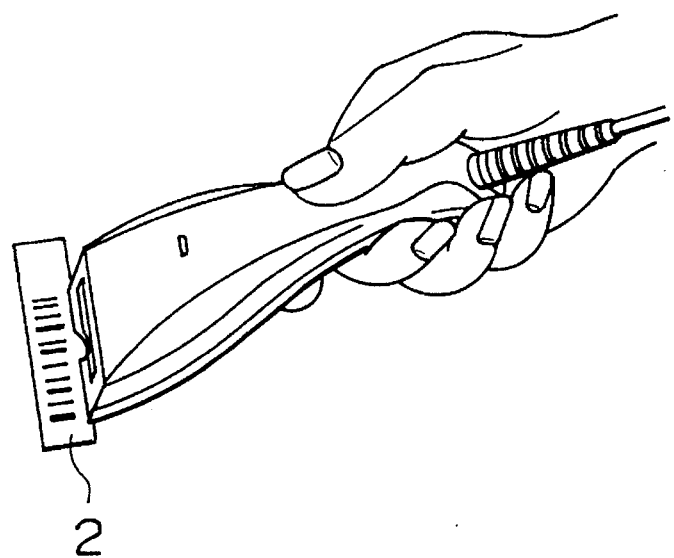

However, when the mirror 9 is provided between the bar code label 2 and the image forming lens 8, because the optical distance from the image forming lens 8 to the image sensor 6 is fixed, the optical distance in the upward and downward directions is increased, although the optical distance in the rightward and leftward directions from the bar code label 2 to the image sensor 6 is reduced. That is, the thickness of the bar code reader near the reading ports is increased, and to operate the bar code reader while checking the position of the bar code label 2, as shown in FIGS. 2A and 2B, thus becomes difficult.

When the mirror 9 is provided between the image forming lens 8 and the image sensor 6, as in the case of this embodiment, the optical distance in the upward and downward directions can be reduced, although the optical distance in the rightward and leftward directions is increased as compared with the above-mentioned case. Accordingly, only the small LED module 4 and the illumination lens 5 are disposed near the reading ports, and the thickness of the portion of the reader near the reading ports can thus be reduced. In other words, when the mirror 9 is provided between the image forming lens 8 and the image sensor 6, the length of the bar code reader 1 in the rightward and leftward directions can be reduced as compared with the conventional bar code reader, although the length thereof in the rightward and leftward directions is increased as compared with the reader in which the mirror 9 is provided between the bar code label 2 and the image forming lens 8. Consequently, in the bar code reader according to this embodiment, the space required to read bar codes can be reduced while the thickness of the reader near the reading ports can be reduced.

Further, in the bar code reader 1 arranged in the manner described above, the reflected light which has passed through the image forming lens 8 is bent in an upward direction as viewed in FIG. 1 so as to allow the reflected light to be condensed on the image sensor 6. The reflected light, which has propagated straight between the reading ports and the image forming lens 8, may be bent in a downward direction by the mirror 9 so that it can be condensed on the image sensor 6 provided below the mirror 9. However, this configuration makes the bar code reader to bulge downward, and makes it difficult for the operator to handle the bar code reader to operate it. Therefore, the configuration offered by the present embodiment, i.e., to bend the reflected light which has passed through the image forming lens 8 in an upward direction to condense the reflected light on the image sensor 6, is the best for reading. Thus, in the bar code reader 1 according to the present invention, the handling portion thereof can be shaped freely, as shown in FIGS. 2A and 2B, and the portion thereof near the reading ports can be made thin. The operator handles the bar code reader 1 in the manner shown in FIGS. 2A and 2B to read the bar code label.

The bar code reader 1 according to the present embodiment also has the following feature.

The reflected light to be condensed on the image sensor 6 must be made incident perpendicular to the light-receiving surface of the image sensor 6. In the achievement of this, the angle of the mirror 9 and the provision of the image sensor 6 are essential factors in the bar code reader 1.

Figure 7:
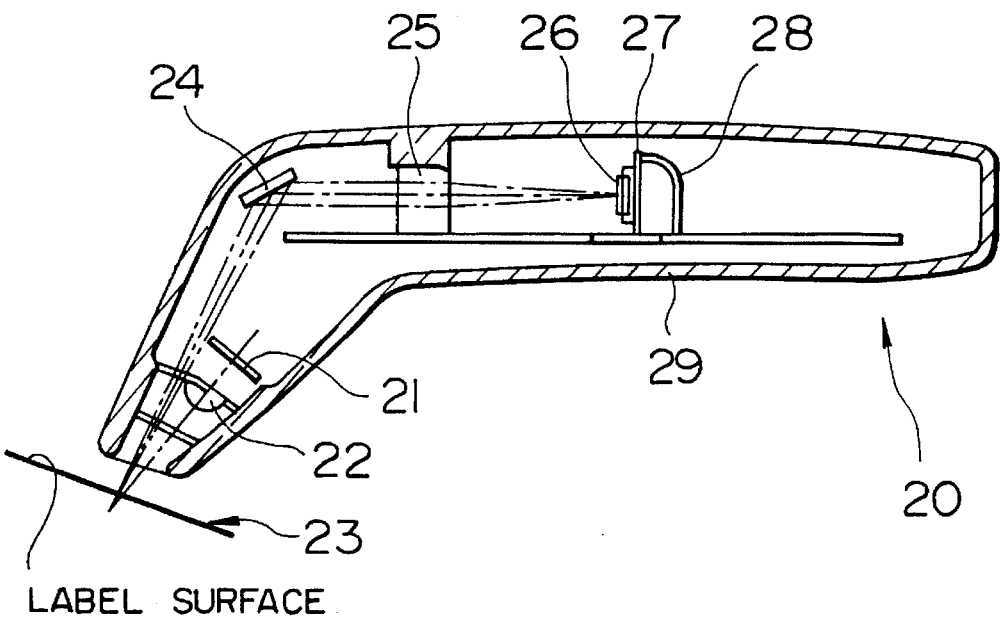
FIG. 7 is a cross-sectional view of a conventional bar code reader.

Conventionally, a fixing substrate 27 to which the image sensor 26 is fixed is fixed to a casing 29 by means of a connection portion 28 and a fixing member which is not shown, as shown in FIG. 7. However, since the image forming lens 25 and the image sensor 26 are assembled separately in the above-described conventional fixing method, errors are generated, the number of parts is increased or the structure is weak.

Figure 3:
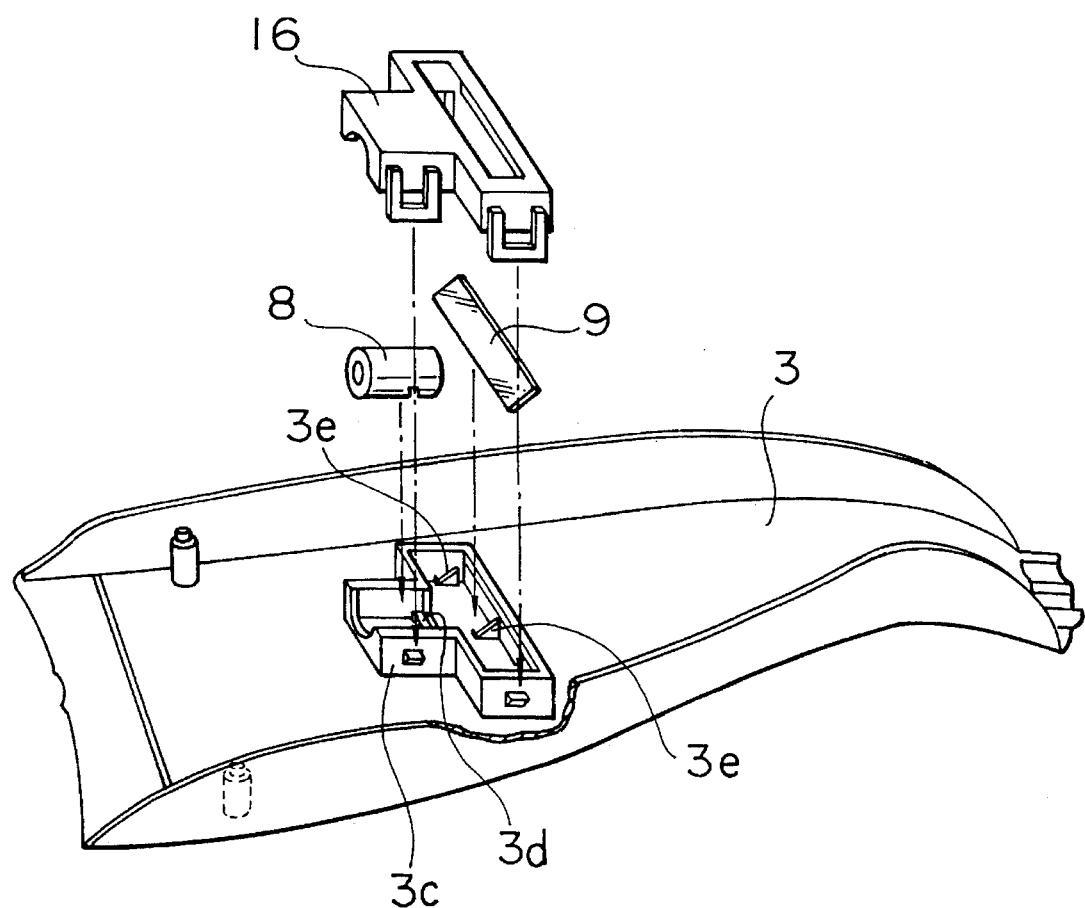
FIG. 3 is an exploded view showing the internal state of the bar code reader according to the present invention.

Hence, in this embodiment, the above-described problems are overcome by the structure which will be described below. First, a setting portion 3c for setting the image forming lens 8 and the mirror 9 is formed integrally with the casing 3 on the inner surface of the bottom thereof, as shown in FIG. 3. The setting portion 3c has a fixing portion 3d for fixing the lower half of the image forming lens 8, and mirror setting portions 3e for setting the mirror 9 at a predetermined angle. The upper half of the image forming lens 8 and the mirror 9 are fixed by placing a fixing member 16 on the setting portion 3c, as shown in FIG. 3. The setting angle of the mirror 9 is determined by the shape of the mirror setting portions 3e, which has substantially no error. Consequently, substantially no error is generated in the setting angle of the mirror 9. Further, since the positional relationship between the image forming lens 8 and the mirror 9 is fixed by the members common thereto, i.e., the fixing member 16 and the setting portion 3c, substantially no error is generated in the positional relationship between the image forming lens 8 and the mirror 9. Thus, there is substantially no error in the optical path along which the reflected light propagates in the process in which the reflected light passes through the image forming lens 8, is bent by the mirror 9 and is then condensed on the image sensor 6, and the reflected light can thus be reliably made incident on the light-receiving surface of the image sensor 6.

Figure 4:
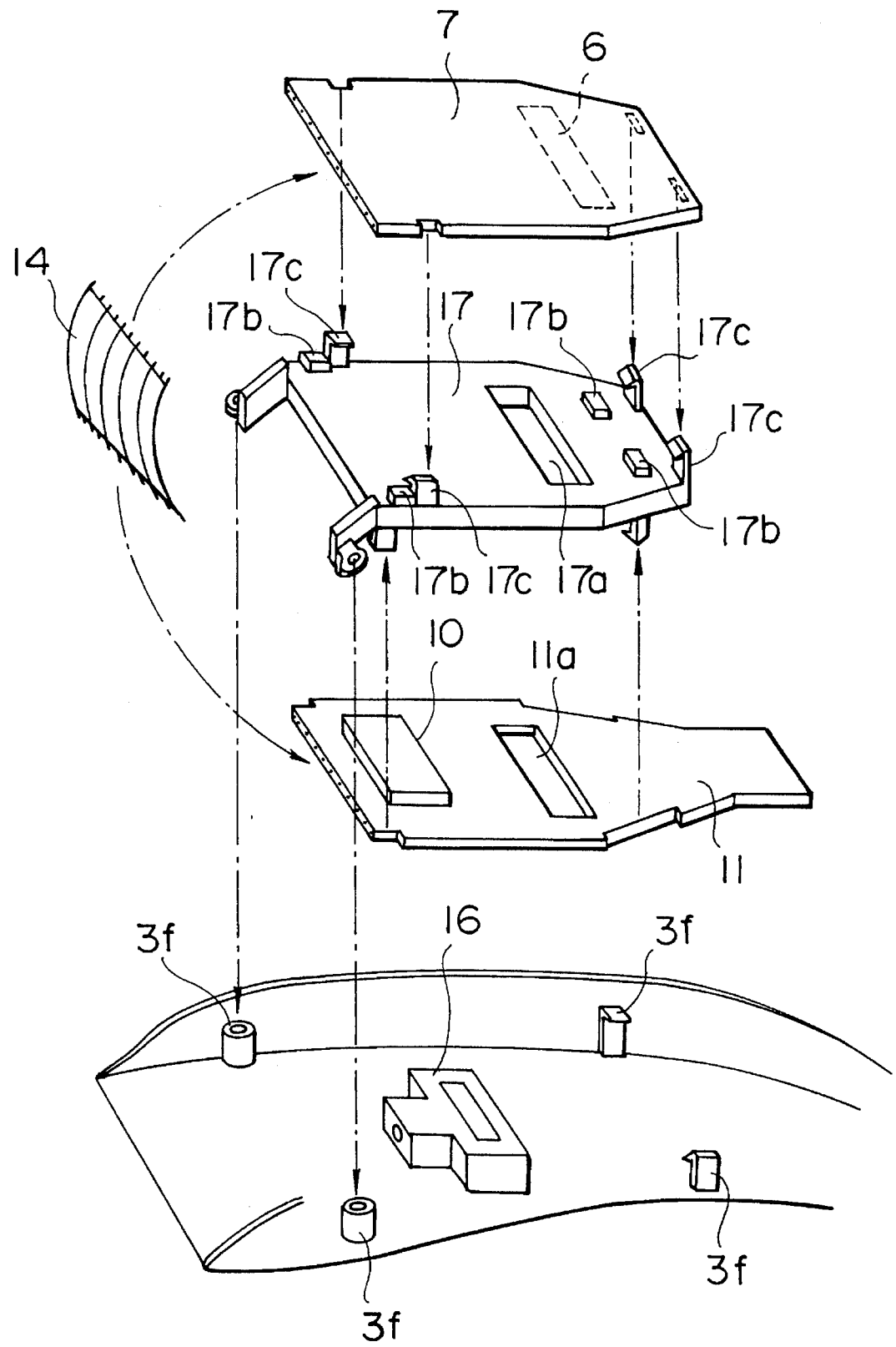
FIG. 4 is another exploded view showing the internal state of the bar code reader according to the present invention.

The present embodiment also has the following feature in terms of the layout of the fixing plate 7 and the substrate 11. As shown in FIG. 4, the fixing plate 7 on which the image sensor 6 is placed is joined to the upper surface (as viewed in FIG. 4) of a coupling member 17, and the substrate 11 on which the ECU 10 is provided is joined to the lower surface of the coupling member 17. At that time, the vertical position of the fixing plate 7 is adjusted by four position adjusting portions 17b formed on the coupling member 17, and the horizontal position thereof is adjusted by four locking portions 17c formed on the coupling member 17. The coupling member 17 has an opening 17a at the central portion thereof. The opening 17a is in alignment with the light-receiving surface of the image sensor 6 so that the reflected light from the mirror 9 can be condensed on the light-receiving surface of the image sensor 6 therethrough. As mentioned above, the substrate 11 joined to the opposite side of the coupling member 17 to that to which the fixing portion 7 is joined has the opening 11a through which the reflected light from the mirror 9 passes. The coupling member 17 to which the fixing portion 7 and the substrate 11 are joined is fixed by four fixing portions 3f formed in the casing 3, as shown in FIG. 4. That is, the setting of the fixing plate 7 and substrate 11 is facilitated, because the fixing plate 7, the substrate 11 and the coupling member 17 are formed as one unit and the coupling member 17 alone is fixed to the inner side of the casing 3.

When the image sensor 6 is set, it is not necessary for the vertical position thereof to be adjusted, unlike the conventional case. That is, the image sensor can be set only by adjusting the position of the fixing plate 7 on which the image sensor 6 is set in the rightward and leftward directions. Further, the reflected light from the mirror 9 must be passed through the substrate 11 and the coupling member 17, and no member can be placed on the substrate 11 or the coupling member 17. In this embodiment, since the substrate 11 and the coupling member 17 respectively have the openings 11a and 17a in order to permit the reflected light to pass therethrough, the inner space of the reader can be effectively utilized.

The bar code reader 1 is also characterized in that since the reading portions 3a and 3b have different lengths, a gap is generated when the bar code reader 1 is brought into contact with the bar code label 2, permitting the operator to readily confirm whether the bar code label 2 is being illuminated reliably with the illumination light from the bar code reader 1.

Figure 5:
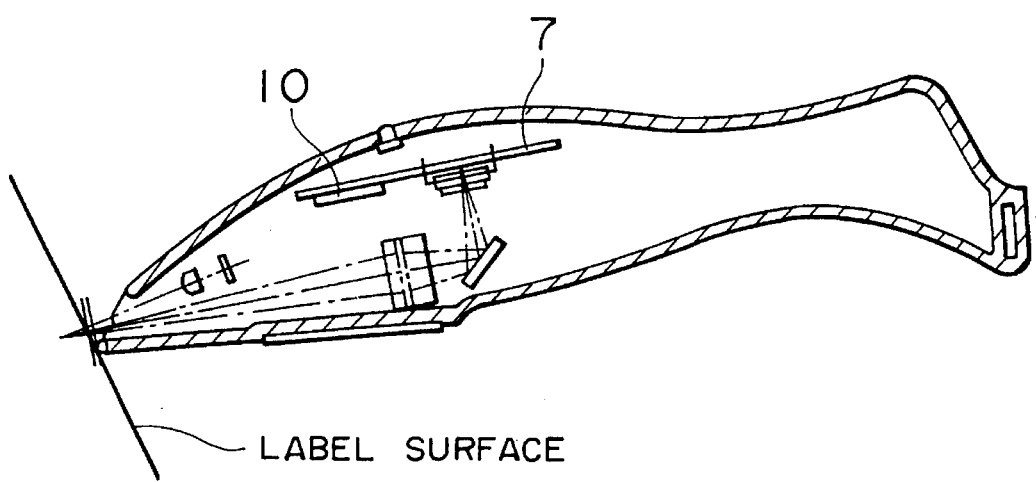
FIG. 5 is a cross-sectional view showing another embodiment of the present invention.

In this embodiment, the ECU 10 serving as the reading means is provided on the substrate 11. However, the ECU 10 may be provided on the fixing plate 7, as shown in FIG. 5. In this way, the provision of the substrate 11 can be eliminated. Further, in this embodiment, the present invention is applied to a bar code reader. However, the present invention can also be applied to an optical character reader (OCR) employing a two-dimensional area sensor.

Figure 6:
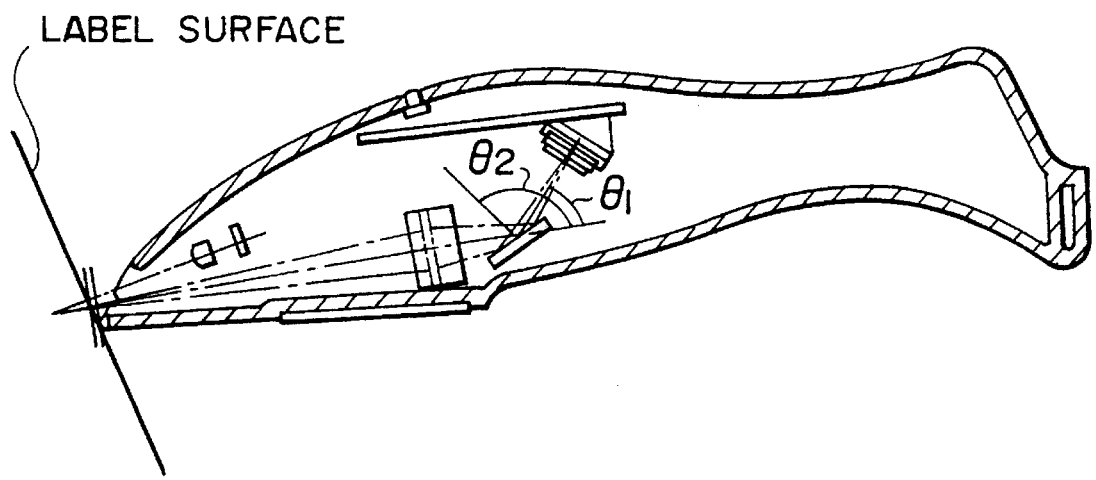
FIG. 6 is a cross-sectional view showing still another embodiment of the present invention.

Further, in this embodiment, the reflected light is bent in a direction substantially perpendicular to the direction of incidence by the mirror 9. However, the angle at which the reflected light is bent may be between (θ=) 45 degrees and (θ=) 135 degrees with the line extending between the image forming lens 8 and the mirror 9 used as a reference, as shown in FIG. 6.

Finally, in the foregoing description of the present invention, the invention has been disclosed with reference to specific embodiments thereof. It will, however, be evident that various modification and changes may be made to the specific embodiments of the present invention without departing from the broader spirit and scope of the invention as set forth in the appended claims. Accordingly, the description of the present invention in this document is to be regarded in an illustrative, rather than a restrictive, sense.

What is claimed is:

1. An optical information reading apparatus comprising:

illumination means for illuminating with light an objective of reading on which optical information is written;

image forming means for condensing light generated by said illumination light from said illumination means and reflected by said objective of reading, on a predetermined reading position;

imaging means disposed at said reading position to convert said reflected light into an electrical signal;

reading means for reading said optical information on the basis of the electrical signal from said imaging means;

an optical path changing means disposed in an optical path of said reflected light which is not yet condensed on said predetermined reading position to bend a direction of propagation of said reflected light;

a reading means setting substrate on which said reading means is provided, said reading means setting substrate being substantially contained in a plane crossing said optical path between said optical path changing means and said imaging means;

an imaging means setting substrate on which at least said imaging means is provided; and a coupling member disposed between said imaging means setting substrate and said reading means setting substrate which couples said imaging means setting substrate and said reading means setting substrate to each other, said coupling member being fixed to a casing substantially enclosing said optical path;

wherein said reading means setting substrate and said coupling member respectively have openings through which said reflected light passes so that it can be condensed on said predetermined reading position.

2. An optical information reading apparatus according to claim 1, wherein said optical path changing means bends the direction of propagation of said reflected light so that an angle between the direction of propagation of the reflected light which is not yet bent and the direction of propagation of the reflected light which has been bent is between 45° and 135°.

3. The apparatus of claim 1, wherein said coupling member connects said imaging means setting substrate and said reading means setting substrate to said casing.

4. The apparatus of claim 1, wherein:

said reading means substrate extends beyond said imaging means substrate along a longitudinal axis of said substrates to provide a narrowed substrate portion; and said casing comprises a grip covering said narrowed substrate portion for handling by an operator.

5. An optical information reading apparatus according to claim 1, wherein said image forming means and said optical path changing means are fixed in said casing at a predetermined position by the same fixing member.

6. An optical information reading apparatus according to claim 1, wherein reading ports formed on a front surface of said apparatus to take in the reflected light from said objective for reading on which said optical information is written comprise end portions located at different distances from said objective for reading, a first one of said end portions which is located on a side of said casing where an operator visually recognizes the objective for reading during reading being at a distance farther from said objective for reading than another of said end portions.

7. An optical information reading apparatus according to claim 1, wherein said optical path changing means bends the direction of propagation of said reflected light which is not yet condensed on said predetermined reading position in a direction substantially perpendicular to the direction of propagation.

8. An optical information reading apparatus comprising:

casing means having a head portion and a handle portion to be held by an operator, said head portion being wider than said handle portion and being provided with an opening through which reflection light from an information carrying medium passes along an optical path;

condensing means provided in said head portion for condensing said reflected light on a predetermined position;

imaging means provided in said head portion for converting received light into an electrical signal;

optical path changing means disposed behind said condensing means for preventing said reflection light passed through said condensing means from propagating toward said handle portion and for changing the propagation direction of the same toward said imaging means within said head portion;

reading means for reading information in said information carrying medium on the basis of the electrical signal from said imaging means;

a reading means setting substrate on which said reading means is provided, said reading means setting substrate being substantially contained in a plane crossing said optical path between said optical path changing means and said imaging means and having an opening through which said reflection light passes so that it can be condensed on said predetermined position.

9. An optical information reading apparatus according to claim 8, wherein said imaging means and said optical path changing means are provided at one and the other of upper and lower positions in said head portion, respectively.

10. An optical information reading apparatus according to claim 8, wherein said head portion is formed integrally with support means shaped to fixedly receive thereon said condensing means and said optical path changing means.

11. An optical information reading apparatus according to claim 8, wherein said head portion includes an upper and lower body portions defining said opening therebetween, and said lower body portion extends longitudinally beyond said upper body portion so that information on said information carrying medium can be viewed when said lower body portion is contacted with said information carrying medium.

12. An optical information reading apparatus comprising:
   a light source illuminating a printed indicia;
   a lens assembly condensing light selectively reflected by said indicia on a predetermined position;
   a light sensor at said predetermined position converting said condensed light into an electrical signal representative of said indicia;
   processing means for processing said electrical signal;
   an optical element, disposed in an optical path of said reflected light between said lens assembly and said light sensor, which bends a direction of propagation of said reflected light; and a mounting member substantially contained in a plane crossing said optical path between said optical element and said light sensor, having at least one of said light source, said lens assembly and said processing means mounted thereon;
   wherein said mounting member has an opening on a line between said optical element and said light sensor through which said reflected light passes so that it can be condensed on said light sensor.

13. An apparatus according to claim 12, wherein said optical element bends the direction of propagation of the reflected light at an angle between 45° and 135°.

14. An apparatus according to claim 12, wherein said processing means is mounted on said mounting member.

15. An apparatus according to claim 12, further comprising:
   a light sensor setting substrate having said light sensor mounted thereon; and
   a coupling member disposed between said light sensor setting substrate and said mounting member which couples said light sensor setting substrate and said mounting member to each other, said coupling member being fixed to a casing substantially enclosing said optical path.

16. An apparatus according to claim 15, wherein said coupling member has an opening through which said reflected light passes so that it can be condensed on said light sensor.

17. An optical information reading apparatus comprising:
   illumination means for illuminating with light an objective of reading on which optical information is written;
   image forming means for condensing light generated by said illumination light from said illumination means and reflected by said objective of reading, on a predetermined reading position;
   imaging means disposed at said reading position to convert said reflected light into an electrical signal;
   reading means for reading said optical information on the basis of the electrical signal from said imaging means;
   an optical path changing means disposed in an optical path of said reflected light which is not yet condensed on said predetermined reading position to bend a direction of propagation of said reflected light;
   a fixing member fixing said image forming means and said optical path changing means to said case;
   a reading means setting substrate on which said reading means is provided, said reading means setting substrate being substantially contained in a plane crossing said optical path between said optical path changing means and said imaging means;
   an imaging means setting substrate on which at least said imaging means is provided;
   a coupling member disposed between said imaging means setting substrate and said reading means setting substrate which couples said imaging means setting substrate and said reading means setting substrate to each other, said coupling member being fixed to a casing substantially enclosing said optical path; and
   reading ports formed on a front surface of said apparatus to take in the reflected light from said objective for reading on which said optical information is written comprise end portions located at different distances from said objective for reading, a first one of said end portions which is located on a side of said casing where an operator visually recognizes the objective for reading during reading being at a distance farther from said objective for reading than another of said end portions;
   wherein said reading means setting substrate and said coupling member respectively have openings through which said reflected light passes so that it can be condensed on said predetermined reading position.

* * * * *

UNITED STATES PATENT AND TRADEMARK OFFICE
CERTIFICATE OF CORRECTION

PATENT NO.   : 5,489,770

DATED        : Feb. 6, 1996

INVENTOR(S)  : Toshiyuki KADOTA; Yasushi IWADE; Tadao OSHIMA

It is certified that error appears in the above-identified patent and that said Letters Patent is hereby corrected as shown below:

ON THE TITLE PAGE:

before Item [21] please add: --

[73]  Assignee:    Nippondenso Co., Ltd.

Kariya-shi, Japan --; and before Item [57] please add: --
Attorney, Agent, or Firm - Cushman, Darby & Cushman --.

Signed and Sealed this

Eleventh Day of June, 1996

Attest:

BRUCE LEHMAN

*Attesting Officer*          *Commissioner of Patents and Trademarks*